United States Patent
Jones et al.

(10) Patent No.: US 6,229,935 B1
(45) Date of Patent: May 8, 2001

(54) DISPERSION SLOPE COMPENSATION IN OPTICAL TRANSMISSION SYSTEMS

(75) Inventors: Kevan Peter Jones, Devon; Dimitra Simeonidou, Surrey, both of (GB)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/091,534

(22) PCT Filed: Dec. 19, 1996

(86) PCT No.: PCT/GB96/03129

§ 371 Date: Jan. 15, 1999

§ 102(e) Date: Jan. 15, 1999

(87) PCT Pub. No.: WO97/23966

PCT Pub. Date: Jul. 3, 1997

(30) Foreign Application Priority Data

Dec. 21, 1995 (GB) .................................. 9526183

(51) Int. Cl.[7] ........................................ G02B 6/28
(52) U.S. Cl. ................... 385/24; 385/44; 385/46
(58) Field of Search ................ 385/24, 27, 43–48, 385/30, 123; 359/161, 341, 124, 577, 179

(56) References Cited

U.S. PATENT DOCUMENTS 5,224,183  6/1993  Dugan ..................................... 385/24
5,978,131 * 11/1999  Lauzon et al. ..................... 385/27 X

FOREIGN PATENT DOCUMENTS 195 16 439
A1        11/1995   (DE) .
0 732 819 A2   3/1995   (EP) .
0 658 988 A1   6/1995   (EP) .

OTHER PUBLICATIONS

CLEO '95, Conference on Lasters and Electro–Optics, Opt. Soc. America, May 1995, Baltimore, MD, pp. 92–93, XP000616828, D. Simeonidou et al.: "Effect of Local Fiber Dispersion on the Performance of Long Distance Transmission Systems With Erbium–Doped Fiber Amplifiers", see p. 92, column 2.

Patent Abstracts of Japan, vol. 96, No. 002, JP 08 054525 A (Furukawa Electric Co Ltd., Feb. 27, 1996.

* cited by examiner

*Primary Examiner*—Phan T. H. Palmer
(74) *Attorney, Agent, or Firm*—Ware, Fressola, Van Der Sluys & Adolphson LLP

(57) ABSTRACT

A wavelength division multiplex transmission system has an optical fiber trunk (12) with one or more branching units (18) each providing an add/drop channel (22, 20). In the branch, components are provided for pre-dispersing the wavelength of the add channel, prior to route to the trunk (12), with a dispersion characteristic of opposite sign to the dispersion occurring in the trunk, thereby to compensate for dispersion of that wavelength occurring along the trunk.

20 Claims, 3 Drawing Sheets

DISPERSION SLOPE COMPENSATION IN OPTICAL TRANSMISSION SYSTEMS

BACKGROUND OF INVENTION

1. Field of Invention

This invention relates to dispersion slope compensation in optical transmission systems and more particularly to compensation in wavelength division multiplex systems (WDM) having one or more branches.

2. Description of Related Art

In a conventional WDM transmission system such as is shown in FIG. 1 a transmitter 10 is arranged to provide on the trunk fiber 12 different traffic signals each on a different wavelength which wavelength is intended for receipt by a specific receiver which may be located at the end of a branch from the trunk. Such systems normally employ optical amplifiers/repeaters 14 at spaced locations along the trunk to compensate for signal attenuation with distance along the trunk. Such systems employ dispersion shifted optical fiber (DSF) with the channels located in the negative dispersion regime (with the channel wavelengths shorter than the wavelength of minimum dispersion, $\lambda_0$, of the fiber). One method, known to us, of compensating for dispersion occurring on the trunk is for the net dispersion to be periodically equalised using non-dispersion shifted fiber (NDSF) 16 with a $\lambda_0$ of around 1300 nm (positive dispersion regime). The system can only be equalised to a net dispersion zero at one particular wavelength, without splitting the channels and individually equalising them (very complicated). Consequently the other channels will accumulate additional dispersion depending upon the wavelength offset from the net $\lambda_0$ and the dispersion slope of the transmission fibre. This differential dispersion is not reset by the equalisation procedure. The effect of dispersion on the longest and shortest wavelengths at two locations along the trunk are illustrated by FIGS. 1a and 1b whilst the effect of compensation is illustrated by FIG. 1c.

U.S. Pat. No. 5,224,183 describes a WDM signal compensation system in which dispersion is under compensated and the remaining compensation is carried out via separate means per channel either at the transmitter or receiver end. This adds considerably to the complexity of the system.

BRIEF SUMMARY OF INVENTION

This invention seeks to provide a compensation system and method which provides improved compensation in a simple manner.

According to one aspect of the invention there is provided a WDM optical transmission system having an optical fibre trunk with one or more branching units characterised in the provision of an add/drop channel, having means for pre-dispersing the wavelength of the add channel with a dispersion characteristic of opposite sign to the dispersion characteristic which occurs in the trunk. By employing a dispersion characteristic of opposite sign to the dispersion occurring in the trunk, compensation for dispersion of that wavelength occurring along the trunk is achieved.

There may be provided in the branch drop channel means for dispersing the drop wavelength with a dispersion characteristic of opposite sign to dispersion of that wavelength occurring in the trunk.

One possible implementation of the system is that the means for pre-dispersing the wavelength of the add channel, or the add and drop channels, is the add fibre, or add and drop fibre itself, which is/are chosen to have a required dispersion characteristic.

In an alternative implementation of the system the means for dispersing the wavelength of the add channel, or add and drop channel comprises a dispersion compensation fibre element of opposite dispersion characteristic coupled in line in the add channel fibre or a compensation fibre element in each of the add and drop channel fibres.

In yet another alternative implementation of the system the means for pre-dispersing the wavelength of the add channel comprises a common fibre path which provides bi-directional compensation. The fibre of the common fibre path may itself be chosen to have the required dispersion characteristic to compensate for dispersion of the wavelength of the add channel in the trunk or the fibre of the common fibre path may include a dispersion compensation element of opposite dispersion characteristic coupled in line in the common fibre to compensate for dispersion of the wavelength of the add channel in the trunk. The common fibre path may be coupled with the drop and add channels via a three port circulator. The common fibre path may be coupled with a transmitter and a receiver of a branch terminal via a three port circulator.

The system may include a chromatic dispersion compensator provided in the trunk prior to the branching unit and the dispersion compensator may be arranged to compensate the intermediate channel wavelength with the drop channel wavelength being chosen to be an upper or lower wavelength.

According to another aspect of the invention there is provided a method of compensating for dispersion occurring in the trunk of a WDM optical transmission system comprising the step of applying to a wavelength to be added to the trunk from a branch a dispersion of opposite sign to the dispersion of that wavelength occurring on the trunk.

In order that the invention and its various other preferred features may be understood more easily, some embodiments thereof will now be described, by way of example only, with reference to the drawings, in which:

BRIEF DESCRIPTION OF DRAWINGS

The same reference numerals will be employed for similar components throughout the description.

DETAILED DESCRIPTION OF INVENTION

Figure 1:
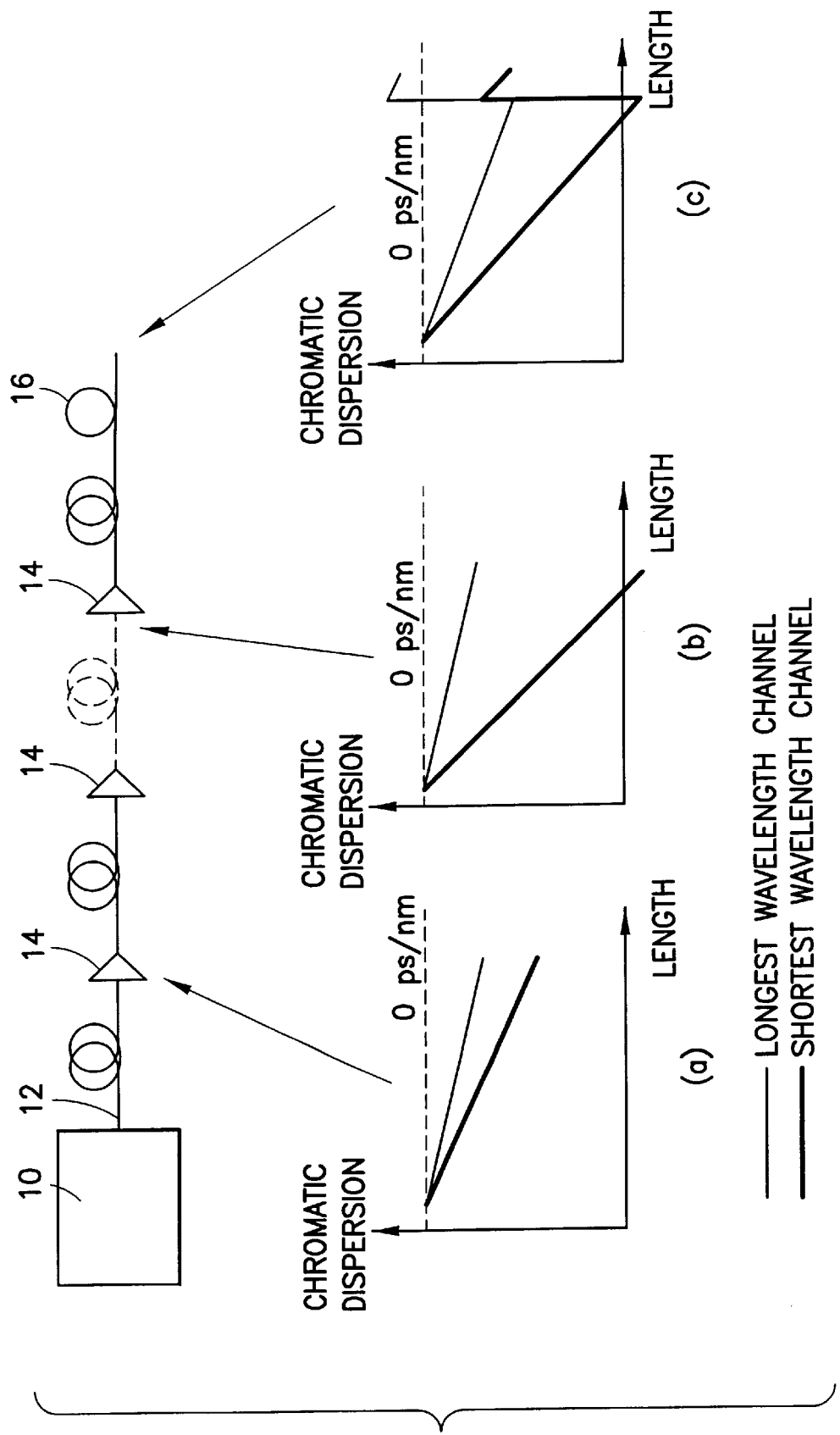
FIG. 1 illustrates a conventional dispersion compensation in the trunk by a method known to us and previously described.
Figure 2:
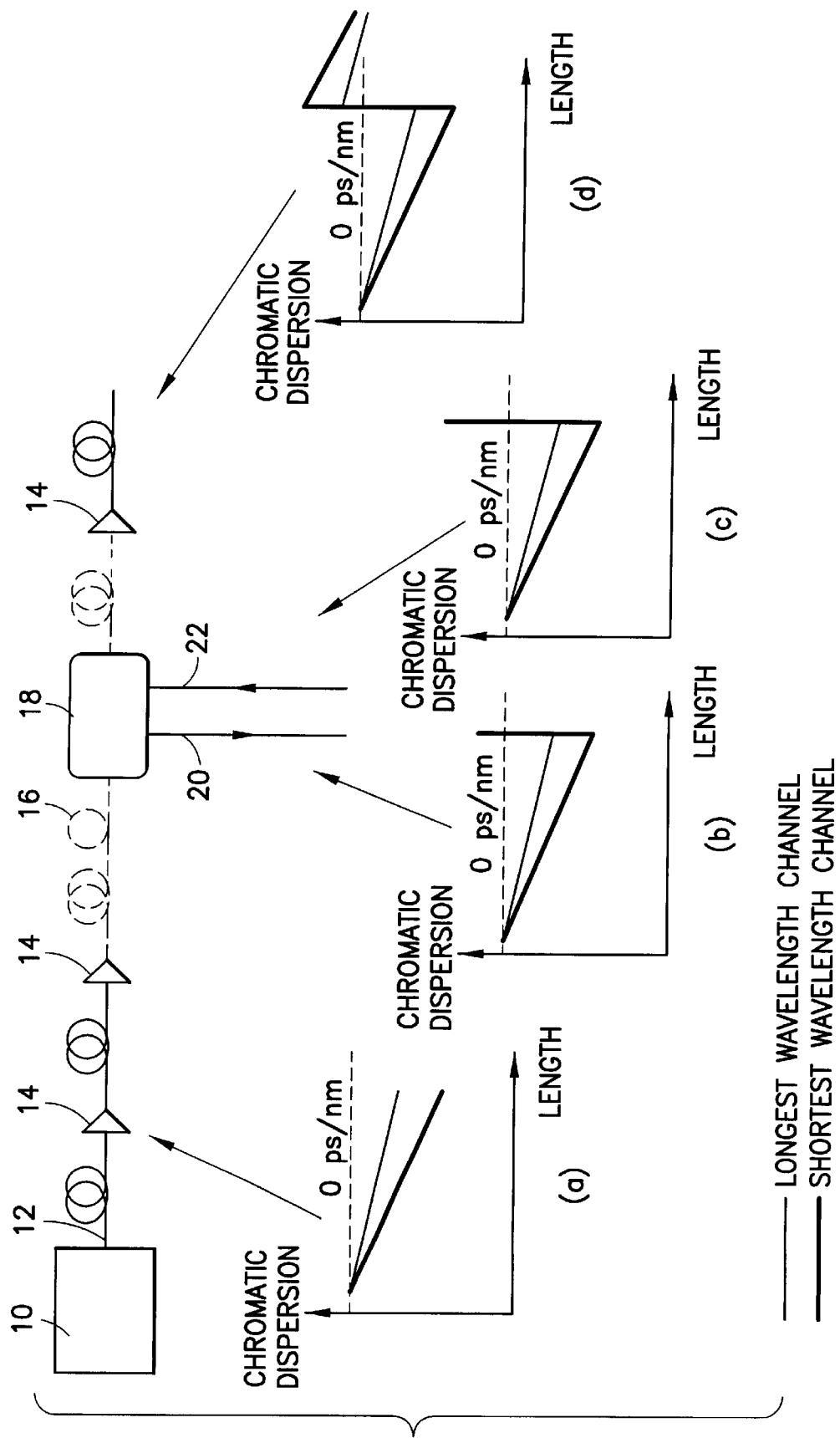
FIG. 2 illustrates dispersement compensation in a branch in accordance with the invention.

Referring now to FIG. 2 there is shown schematically a WDM system similar to that illustrated in FIG. 1 and having optional NDSF 16. The Figure shows a branching unit 18 in the form of a wavelength add/drop multiplexer (W-ADM) which is arranged to route a signal carried by a specific wavelength from the trunk onto a drop fibre 20 for onward transmission by a receiver at the end of the branch and to introduce to the trunk a signal carried by the same or a different wavelength from a transmitter at the end of the branch which signal wavelength is provided on the add fibre 22. For such branched WDM systems that include wavelength multiplex branching units along the trunk (main) cable, the present invention provides means to independently equalise the wavelength channel that is add/dropped at the branching units. FIG. 2 illustrates the principle and FIGS. 2a, 2b, 2c show chromatic dispersion that occurs in the trunk and in the drop and add fibres respectively whilst FIG. 2d illustrates the compensation which has been introduced in the drop/add channel. To facilitate understanding, a special case is shown where the channels have been equalised immediately before the branching unit 18. The compensation introduced is arranged so that the differential dispersion which occurs at the end of the system is minimised. The branch wavelength channels that are dropped are preferably from the edge of the spectrum, on both the long and short wavelength ends. This is useful to reduce the total amount of system pre-emphasis (if used) as these channels are further from the gain peak of the amplifiers and so by travelling a shorter distance, the required channel power is reduced. If the system is equalised for the centre of the gain spectrum (middle channels) then the other channels are the ones which suffer the maximum differential dispersion. Consequently, if we pre-disperse the channel when it is in the spur (when it is just a single wavelength rather than part of a multiplex) we can tailor the differential dispersion to any value we like at the end of the system.

The channels undergo differential dispersion, as before, in the first part of the system and are equalised, on the centre wavelength, just before the branching unit. As a result the dispersion is centred around zero but shows the same accumulated differential dispersion as before. The shortest wavelength channel, in this case, is dropped out of the spectrum in the trunk and detected in the spur. The add channel, at the same wavelength as the drop, is pre-dispersed such that the cumulative dispersion at the output of the branching unit 18 (for the add channel) is the same magnitude but opposite sign of dispersion when compared to the drop channel immediately before the branching unit 18. After transmission through an equal length of line (with the same dispersion characteristic) the shortest wavelength channel is now dispersed the same amount as the centre channel and so will be perfectly compensated at the receiver. This is best illustrated by looking at some example numbers. If we assume the wave lengths are, $\lambda_S$=1554 nm (shortest wavelength)

$\lambda_C$=1558 nm (centre wavelength)

$\lambda_L$=1554 nm (longest wavelength)

$\lambda_0$=1562 nm (wavelength of dispersion zero of transmission fibre)

slope=0.07 ps/nm$^2$·km and we have a system of 2000 km, with a branching unit in the middle of the system, which add/drops the shortest wavelength and dispersion compensation (at the centre wavelength) immediately before the branching unit 18. If we also assume that the dispersion of the spur is negligible when compared to the trunk fibre, we can then compare the case with and without spur equalisation.

TABLE 1

| | | Dispersion (no spur equalisation) in ps/nm | | | | |
|---|---|---|---|---|---|---|
| Dispersion of | Start of system | Before W-ADM (no Eq$^n$.) | Before W-ADM (with Eq$^n$.) | After W-ADM | End of system (no Eq$^n$.) | End of system (with Eq$^n$.) |
| $\lambda_L$ | 0 | −1260 | +280 | +280 | −980 | +560 |
| $\lambda_C$ | 0 | −1540 | 0 | 0 | −1540 | 0 |
| $\lambda_S$ | 0 | −1820 | −280 | 0 | −1820 | −280 |
| Differential dispersion | 0 | 560 | 560 | 280 | 840 | 840 |

As can be seen this is preferable to the case with no add/drop as the add channel is reentered with zero dispersion, so reducing the differential dispersion. It should be noted however, that if the equalisation does not take place immediately before the branching unit, this can also make things very much worse. If we pre-disperse the add channel to have the same magnitude, but the opposite sign then we have,

TABLE 2

| | | Dispersion (with spur equalisation) in ps/nm | | | | |
|---|---|---|---|---|---|---|
| Dispersion of | Start of system | Before W-ADM (no Eq$^n$.) | Before W-ADM (with Eq$^n$.) | After W-ADM | End of system (no Eq$^n$.) | End of system (with Eq$^n$.) |
| $\lambda_L$ | 0 | −1260 | +280 | +280 | −980 | +560 |
| $\lambda_C$ | 0 | −1540 | 0 | 0 | −1540 | 0 |
| $\lambda_S$ | 0 | −1820 | −280 | +280 | −1540 | 0 |
| Differential dispersion | 0 | 560 | 560 | 280 | 560 | 560 |

In a system with more than one W-ADM, we would then add/drop the longest wavelength channel and repeat the procedure to minimise the differential dispersion.

There are a number of ways in which compensating dispersion can be introduced in the spur branch and some possible arrangements will now be described with reference to FIGS. 3 to 5 which show part of the system of FIG. 2 with detail of the spur branch.

Figure 3:
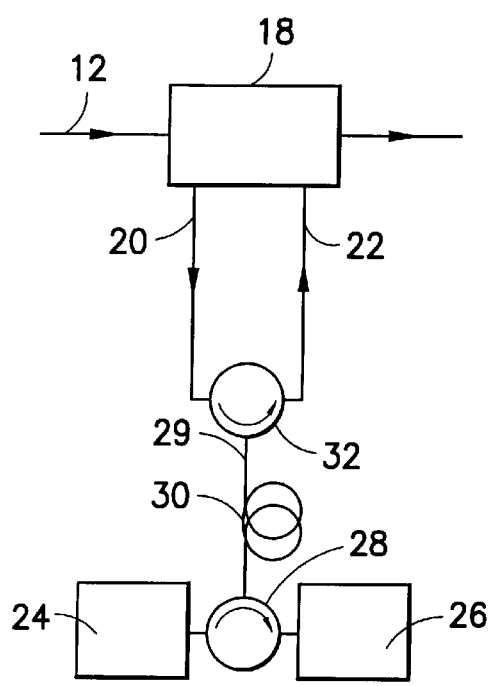
FIG. 3 illustrates one compensation arrangement in accordance with the invention.

In FIG. 3 a spur branch terminal has a transmitter 24 and a receiver 26 with a coupler 28 which in the illustration is shown as a three port circulator. The terminal is coupled via a fibre 29 incorporating a dispersion compensating fibre element 30 (of positive or negative dispersion as necessary) to the drop and add lines 20, 22 via a coupler 32 which in the illustration is shown as a three port coupler. The compensating fibre element is used bi-directionally so the same compensation is given to the add channel as to the drop. This technique produces a compensated channel at the receiver in the spur. This system works best with dispersion compensation immediately before the branching unit 18. Instead of using a compensating fibre element the fibre 29 between the couplers 28 & 32 may be chosen to have dispersion characteristics which compensate directly.

Figure 4:
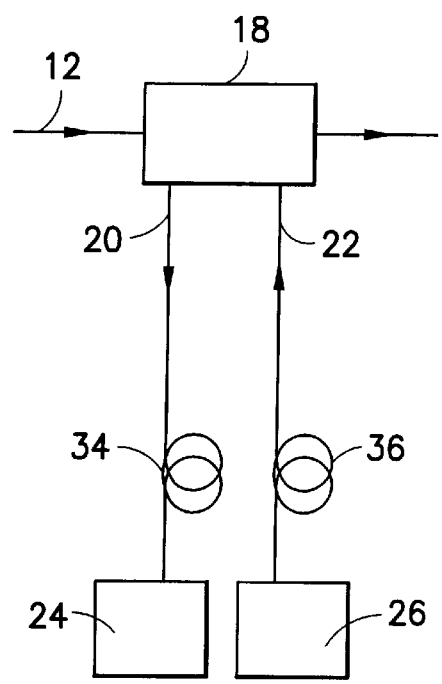
FIG. 4 illustrates an alternative compensation arrangement in accordance with the invention.

FIG. 4 uses two dispersion compensating fibres 34, 36 one in the receive (drop) fibre 20 and one in the transmit (add) fibre 22. This allows different compensation in the drop path than in the add path if required. Note that this (or FIG. 1) could be used to compensate for any dispersion in the spur fibre (e.g. if NDSF was used) if desired.

Figure 5:
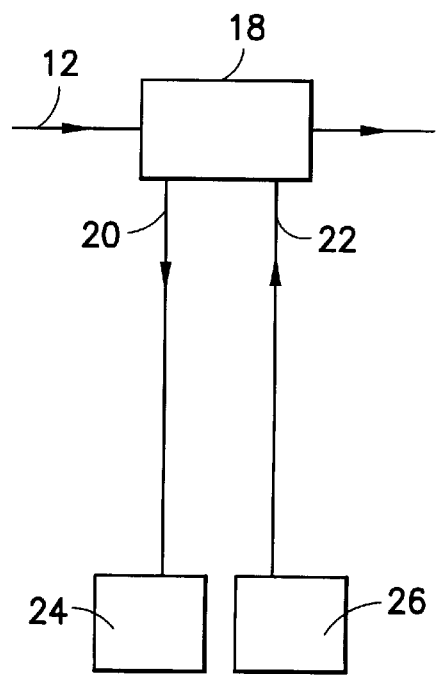
FIG. 5 illustrates yet another alternative compensation arrangement in accordance with the invention.

FIG. 5 employs spur add and/or drop fibres 22, 20 which are chosen to have a dispersion characteristic which compensates directly.

This may be undesirable for other transmission reasons, but is still possible.

The schemes described so far assume that there has been equalisation immediately before the branching unit 18. Whilst this is probably the easiest to understand, by using arbitrary dispersion at the transmit spur (add) we can set the characteristic independent of where the equalisation is performed. This is demonstrated in the table below which uses the same example system, but with the trunk dispersion equalisation immediately after the W-ADM, to show that this system is not dependant upon the equalisation before the W-ADM.

TABLE 3

Arbitrary dispersion compensation (dispersion in ps/nm)

| Dispersion of | Start of system | Before W-ADM (no Eq$^n$.) | After W-ADM (no Eq$^n$.) | After W-ADM (with Eq$^n$.) | End of system (no Eq$^n$.) | End of system (with Eq$^n$.) |
|---|---|---|---|---|---|---|
| $\lambda_L$ | 0 | −1260 | −1260 | +280 | −980 | +560 |
| $\lambda_C$ | 0 | −1540 | −1540 | 0 | −1540 | 0 |
| $\lambda_S$ | 0 | −1820 | −1260* | +280 | −1540 | 0 |
| Differential dispersion | 0 | 560 | 280 | 280 | 560 | 560 |

*Add channel dispersed by −1260 ps/nm after modulation.

So with arbitrary equalisation at the spur, we can achieve the same improvement in the differential dispersion of the channels.

SUMMARY

A simple scheme using pre-dispersion is proposed for WDM systems where the maximum differential dispersion is controlled. This may be of particular importance for high bit rate systems where the limitations of chromatic dispersion are more important due to the smaller pulse widths, but finite dispersion is required to control non-linear effects, in particular four wave mixing.

What is claimed is:

1. A WDM optical transmission system comprising an optical fibre trunk (12) with at least one branching unit (18), an add/drop channel (22, 20), and means (30, 36, 34) for pre-dispersing the wavelength of the add channel (22) with a dispersion characteristic of opposite sign to the dispersion characteristic which occurs in the trunk.

2. A system as claimed in claim 1, wherein the add/drop channel (22, 20) are connected to a common fibre path (29) and the means for pre-dispersing the wavelength of the add channel comprises the common fibre path (29) which provides bi-directional compensation.

3. A system as claimed in claim 2, and further comprising a chromatic dispersion compensator (16) provided in the trunk (12) prior to the branching unit (18).

4. A system as claimed in claim 3 wherein the chromatic dispersion compensator (16) is arranged to compensate an intermediate channel wavelength and the drop channel wavelength is arranged to be an upper or lower wavelength.

5. A system as claimed in claim 2, wherein the fibre path (29) is chosen to have the required dispersion characteristic to compensate for dispersion of the wavelength of the add channel in the trunk.

6. A system as claimed in claim 5 wherein the common fibre path (29) is coupled with the drop and add channels (22, 20) via a three port circulator (32).

7. A system as claimed in claim 5 wherein the common fibre path (29) is coupled with a transmitter (26) and a receiver (24) of a branch terminal via a three port circulator (28).

8. A system as claimed in claim 2, wherein the fibre of the common fibre path (29) includes a dispersion compensation element (30) of said opposite dispersion characteristic coupled in line in the common fibre.

9. A system as claimed in claim 8 wherein the common fibre path (29) is coupled with the drop and add channels (22, 20) via a three port circulator (32).

10. A system as claimed in claim 8 wherein the common fibre path (29) is coupled with a transmitter (26) and a receiver (24) of a branch terminal via a three port circulator (28).

11. A system as claimed in claim 2, wherein the common fibre path (29) is coupled with the drop and add channels (22, 20) via a three port circulator (32).

12. A system as claimed in claim 2, wherein the common fibre path (29) is coupled with a transmitter (26) and a receiver (24) of a branch terminal via a three port circulator (28).

13. A system as claimed in claim 1 and further comprising means (34, 20) in the drop channel (20) for dispersing the drop wavelength with a dispersion characteristic of opposite sign to dispersion characteristic which occurs in the trunk.

14. A system as claimed in claim 13 wherein the drop channel comprises a drop fibre (20) and the means for dispersing the wavelength of the drop channel is the drop fibre (20) itself.

15. A system as claimed in claim 13, wherein the means for dispersing the wavelength of the drop channel (20)

comprises a dispersion compensation fibre element (36) of said opposite dispersion characteristic coupled in line in the drop channel fibre (20).

16. A system as claimed in claim 1, and further comprising a chromatic dispersion compensator (16) provided in the trunk (12) prior to the branching unit (18).

17. A system as claimed in claim 16, wherein the chromatic dispersion compensator (16) is arranged to compensate an intermediate channel wavelength and the drop channel wavelength is arranged to be an upper or lower wavelength.

18. A system as claimed in claim 1, wherein the add channel comprises an add fibre (22) and the means for dispersing the wavelength of the add channel is the add fibre (22) itself.

19. A system as claimed in claim 1, wherein the means for dispersing the wavelength of the add channel (22), comprises a dispersion compensation fibre element (36) of said opposite dispersion characteristic coupled in line in the add channel fibre (22).

20. A method of compensating for dispersion occurring in the trunk of a WDM optical transmission system characterised in the step of applying to a wavelength to be added to the trunk from a branch a dispersion of opposite sign to the dispersion of that wavelength occurring on the trunk.

* * * * *